(12) United States Patent
Brill et al.

(10) Patent No.: US 8,079,550 B2
(45) Date of Patent: Dec. 20, 2011

(54) AUXILIARY POWER UNIT INLET DOOR ACTUATION MECHANISM

(75) Inventors: Jeffrey Carl Brill, Poway, CA (US); Luc Dionne, Candiac (CA)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 782 days.

(21) Appl. No.: 12/175,491

(22) Filed: Jul. 18, 2008

(65) Prior Publication Data
US 2010/0013245 A1 Jan. 21, 2010

(51) Int. Cl.
B64C 1/14 (2006.01)
B64B 1/26 (2006.01)
B64D 41/00 (2006.01)

(52) U.S. Cl. .............. 244/129.4; 244/53 B; 244/53 R; 244/58

(58) Field of Classification Search ........... 297/53 B, 297/53 R, 58, 129.4; 244/53 B, 53 R, 58, 244/129.4
See application file for complete search history.

(56) References Cited

U.S. PATENT DOCUMENTS

| | | | | |
|---|---|---|---|---|
| 3,618,876 A | * | 11/1971 | Skidmore et al. | 244/53 B |
| 3,658,279 A | * | 4/1972 | Robertson | 244/53 R |
| 3,797,785 A | * | 3/1974 | Baerresen et al. | 244/53 R |
| 3,863,867 A | * | 2/1975 | Souslin et al. | 244/53 R X |
| 4,203,566 A | * | 5/1980 | Lord | 244/53 B X |
| 4,250,703 A | * | 2/1981 | Norris et al. | 244/53 B X |
| 4,370,560 A | | 1/1983 | Faulkner et al. | |
| 4,397,431 A | * | 8/1983 | Ben-Porat | 244/53 B |
| 4,399,966 A | * | 8/1983 | Crudden et al. | 244/129.4 |
| 4,418,879 A | * | 12/1983 | Vanderleest | 244/53 B |
| 4,991,795 A | * | 2/1991 | Koncsek | 244/53 B |
| 5,123,240 A | * | 6/1992 | Frost et al. | 244/53 B X |
| 5,284,012 A | * | 2/1994 | Laborie et al. | 244/53 B X |
| 5,944,285 A | * | 8/1999 | Royer et al. | 244/129.4 |
| 6,264,137 B1 | * | 7/2001 | Sheoran | 244/53 B |
| 6,270,309 B1 | * | 8/2001 | Ghetzler et al. | 244/53 B X |
| 6,272,838 B1 | | 8/2001 | Harvell et al. | |
| 6,293,494 B1 | | 9/2001 | Scherer et al. | |
| 6,349,899 B1 | * | 2/2002 | Ralston | 244/53 B |
| 6,581,874 B2 | | 6/2003 | Lemire et al. | |
| 6,901,737 B2 | | 6/2005 | Schnoor | |
| 6,942,181 B2 | | 9/2005 | Dionne | |
| 7,014,144 B2 | * | 3/2006 | Hein et al. | 244/53 B |
| 7,093,666 B2 | | 8/2006 | Trumper | |
| 7,210,652 B2 | * | 5/2007 | Hein et al | 244/53 B |
| 7,337,605 B2 | | 3/2008 | Hagshenas | |
| 7,364,117 B2 | | 4/2008 | Dionne | |
| 7,367,193 B1 | | 5/2008 | Thompson | |
| 7,461,814 B2 | * | 12/2008 | Hein et al. | 244/53 B |
| 7,600,713 B2 | * | 10/2009 | Hein et al. | 244/53 B |
| 7,665,694 B2 | * | 2/2010 | Hein et al. | 244/53 B X |
| 2006/0102776 A1 | * | 5/2006 | Hein et al. | 244/53 R X |
| 2006/0102781 A1 | * | 5/2006 | Hein et al. | 244/58 |
| 2006/0196993 A1 | * | 9/2006 | Hein et al. | 244/53 B X |
| 2007/0025838 A1 | * | 2/2007 | Stelzer | 244/53 B X |
| 2007/0246607 A1 | * | 10/2007 | Sheoran et al. | 244/129.4 |
| 2008/0135689 A1 | * | 6/2008 | Parikh et al. | 244/53 B |
| 2009/0261208 A1 | * | 10/2009 | Belyew | 244/53 B X |

* cited by examiner

Primary Examiner — Rodney B White
(74) Attorney, Agent, or Firm — Carlson, Gaskey & Olds, PC

(57) ABSTRACT

An inlet door and actuation mechanism for an auxiliary power unit has an actuation mechanism mounted within a housing. The housing includes a bearing mount for allowing a bearing on the mechanism to adjust angularly as the inlet door pivots. The bearing mount and bearing provides a fireproof enclosure between areas on opposed sides of a wall of the housing.

19 Claims, 2 Drawing Sheets

AUXILIARY POWER UNIT INLET DOOR ACTUATION MECHANISM

BACKGROUND OF THE INVENTION

This application relates to an actuation mechanism for an auxiliary power unit door.

Auxiliary power units are utilized in aircraft to supply power before the aircraft is in flight, and in some conditions, during flight. An auxiliary power unit is often provided by a relatively small gas turbine engine, and located in the tail cone of the aircraft. Air is necessary for operation of the auxiliary power unit. Thus, an inlet door is selectively opened to allow air to flow into an inlet duct, and then to the auxiliary power unit. To reduce drag, the door is typically closed when the auxiliary power unit is not operating.

An actuating mechanism for the inlet door must be able to articulate within a housing mount as the inlet door moves. In addition, the housing wall through which the actuation mechanism extends, must have a fireproof seal.

In the prior art, a fireproof enclosure has typically been provided around the actuation mechanism. Thus, the total assembly is relatively large and complex.

SUMMARY OF THE INVENTION

An inlet door and actuation mechanism for an auxiliary power unit has an inlet door to be pivotally mounted within an aircraft. The actuating mechanism includes an attachment member to attach to the door. The actuating mechanism is mounted within a housing. The housing includes a bearing mount for allowing a bearing on the actuation mechanism to adjust angularly as the inlet door pivots. The bearing mount and bearing provides a fireproof enclosure between areas on opposed sides of the housing.

These and other features of the present invention can be best understood from the following specification and drawings, the following of which is a brief description.

DETAILED DESCRIPTION OF THE PREFERRED EMBODIMENT

Figure 1:
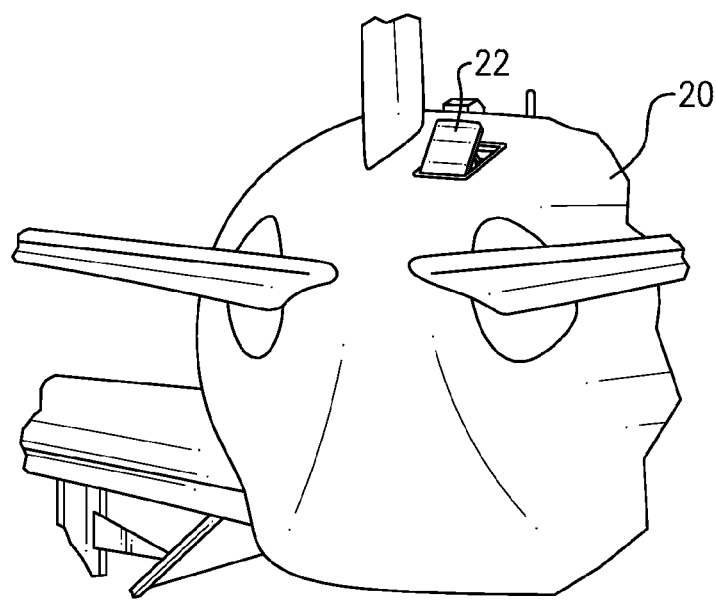
FIG. 1 shows a portion of an aircraft tail and an auxiliary power unit (APU) inlet door.

FIG. 1 shows an aircraft 20 having an auxiliary power inlet door 22 in its tail cone. As known, when an auxiliary power unit is operating, it will require air. On the other hand, when the auxiliary power unit is not in operation, the inlet door is preferably closed to minimize drag on the overall aircraft 20. Thus, a mechanism to selectively drive the inlet door 22 between open and closed positions is required.

Figure 2:
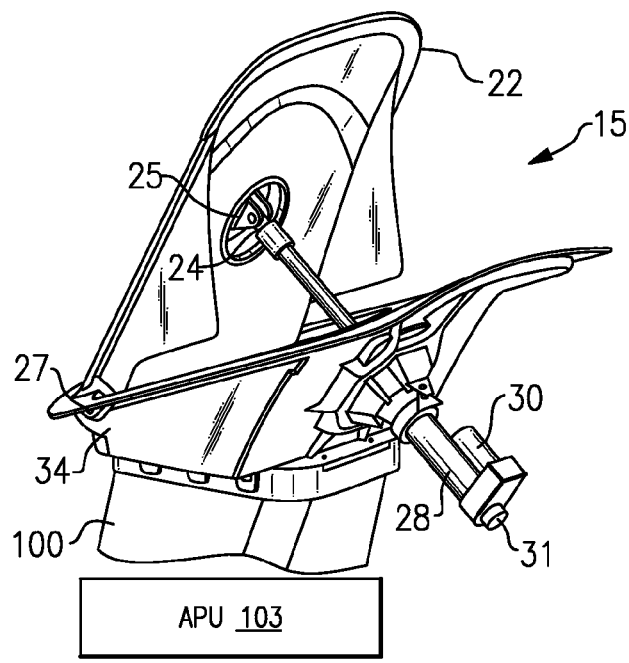
FIG. 2 shows an actuation mechanism and an inlet door.

FIG. 2 shows an actuation mechanism 15 for inlet door 22. As shown, a clevis 24 is received in a mount 25 on inlet door 22. The clevis may include a ball structure. The inlet door is also pivotally mounted at 27 to the aircraft. While a particular door arrangement is illustrated, the actuation mechanism of this application would also be applicable to flush inlet configurations such as divergent or parallel wall NACA scoop doors. Note that the clevis 24 may be provided by other structure, and may be referred to as an "attachment member" for attaching an actuation mechanism to the door. As can be appreciated, the clevis 24 is mounted to the door remotely from the pivot mount 27.

An actuator 28 is driven by a rotary step motor 30. An incremental rotor encoder 31 stores a rotated position of the actuator 28 to provide feedback on the position of the door 22.

An inlet duct 100 carries the air downstream to an APU 103. A housing 34 for the inlet door is connected to the inlet duct 100. As can be appreciated, the housing 34 provides a portion of an air duct which is communicated to the inlet duct 100. The housing 34 includes a plurality of walls, including one wall which will mount the actuator 28 to allow angular adjustment, as will be described below.

Figure 3A:
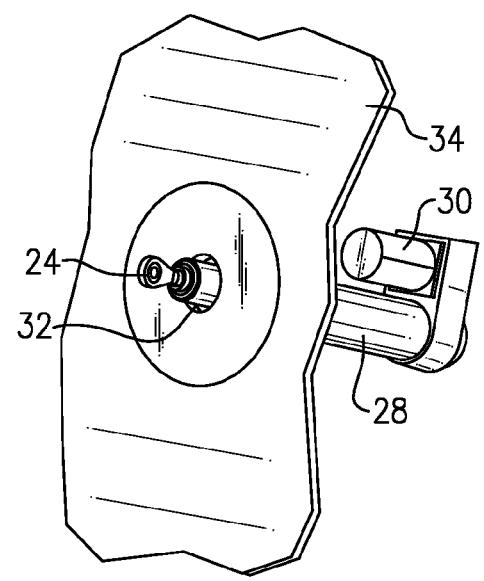
FIG. 3A shows a view of the actuation mechanism in its housing.

As shown in FIG. 3A, an inlet door housing 34 has the clevis 24 extending through an opening 32. The opening 32 allows the clevis 24, and the actuator 28 to adjust as the inlet door 22 pivots. That is, as the inlet door 22 pivots, the clevis 24 and the actuator 28 will articulate to adjust for the movement of the inlet door 22.

Figure 3B:
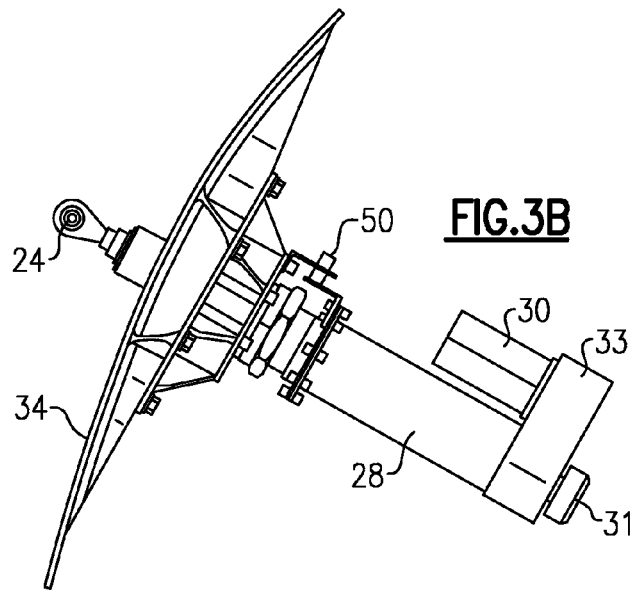
FIG. 3B is a side view of the actuation mechanism of FIG. 3A.

FIG. 3B shows the arrangement of the actuator 28, the motor 30, a gear train 33, and the rotary encoder 31. The combined assembly can be easily removed as a unit for replacement or repair.

Figure 4A:
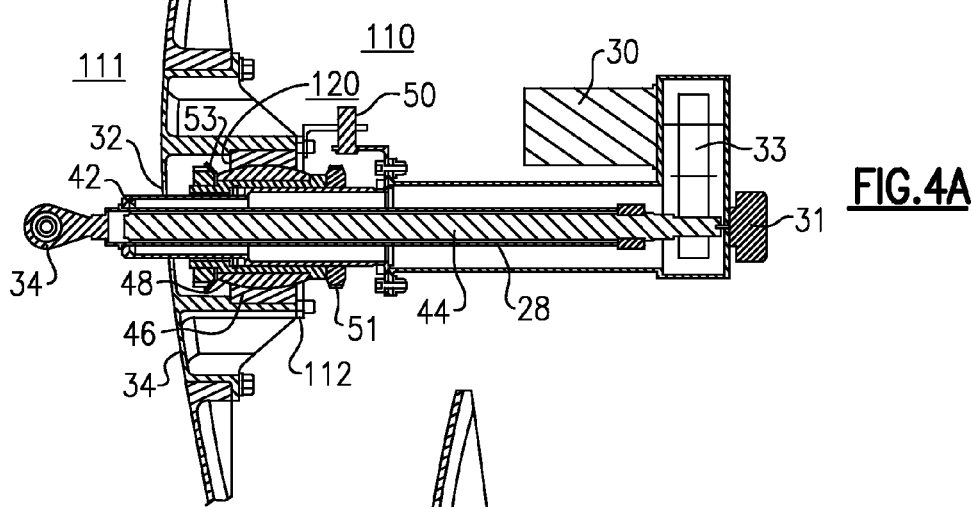
FIG. 4A is a cross-sectional view through the actuation mechanism.
Figure 4B:
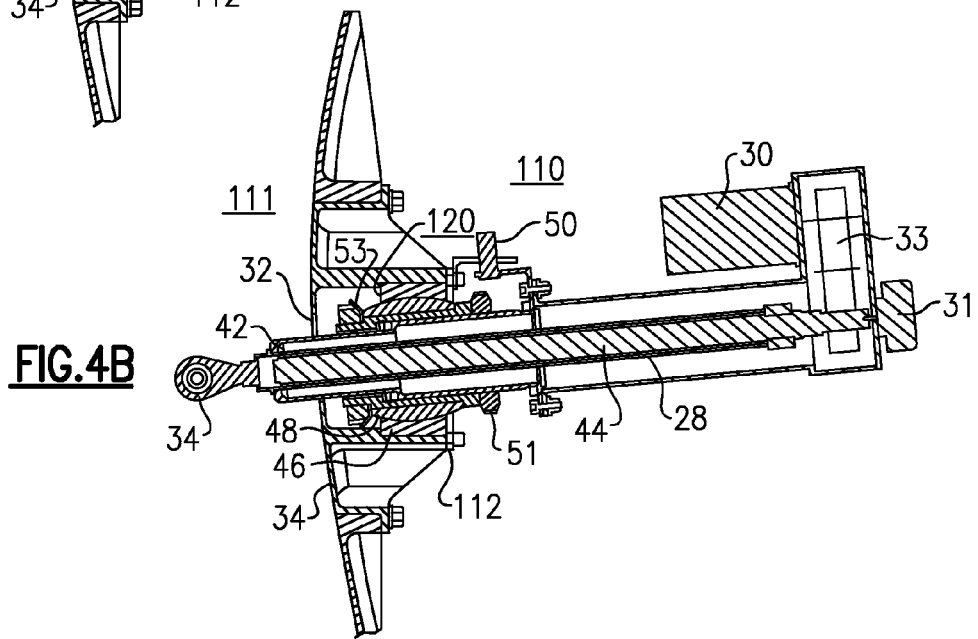
FIG. 4B shows the FIG. 4A view after some articulation.

FIG. 4A is a cross-sectional view through the actuator 28. The gear train 33 is shown schematically, but will connect the rotary step motor 30 to drive a screw 44 to rotate. An outer drive member 42 is internally threaded, and is driven by the screw 44. Essentially, drive member 42 functions as a follower. Anti-rotation fittings 50 prevent rotation of the drive member 42 as the screw 44 rotates. The anti-rotation fittings 50 will allow the drive member 42, screw 44, motor 30, gear train 33, and rotary encoder 31 to pivot as the door moves, as shown in FIG. 4B. A dog and slot arrangement may be used for anti-rotation fitting 50.

A ball 48 is received within a bearing mount 46 in the housing 34. Jam nuts 51 hold the ball 48 tightly against an abutment 53. A plate 112 holds the bearing mount 46 at a desired position. As the actuator 28 pivots with adjustment of the inlet door 22, the ball 48 articulates on a bearing mount 46.

As can be appreciated, the ball 48 has a circular outer periphery in this cross-section which mates with a circular cross-section of the bearing mount 46. Ball 48 and bearing mount 46 are both disclosed as being part-spherical. Typically, the actuator 28 will only pivot within the plane of FIG. 3 due to the anti-rotation fitting 50. The use of the ball 48 provides a fireproof enclosure between one side 110 of the housing and an air duct side 111. Thus, a fireproof connection is provided without any separate enclosure or complex connection.

As can be appreciated from FIGS. 2 and 4A, the housing 34 actually defines an enclosure communicating with the inlet duct 100. The area 111 would be within the enclosure, while the area 110 is outside of the enclosure.

As should be appreciated from FIGS. 4A and 4B, although the ball 48 moves freely within the bearing mount 36, the ball 48 is larger than a front opening 120 in the bearing mount 36 such that the ball 48 will continue to fully enclose the opening 120 to provide the fireproof enclosure.

The ball 48 and mount 46 are formed of an appropriate metal, and may be formed of an appropriate steel such that they will provide a fireproof enclosure separating areas 110 and 111 on opposed sides of a wall of housing 34.

The software for a control for the motor 30 includes a reset function that resets the position feedback to zero each time the door is known to be closed. Of course, either extreme of travel of the door can be utilized as the zero position at reset. That is, the door fully opened can also be utilized as the zero position.

The rotary encoder 31 would then restart at each door opening sequence to recalculate the position, and provide feedback to the control for the motor 30.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An inlet door and actuation mechanism for an auxiliary power unit comprising:
   an inlet door to be pivotally mounted;
   a mechanism for driving said inlet door to pivot, said mechanism including an attachment member attached to said door, said mechanism being mounted within a housing, a wall of said housing including a bearing mount for allowing a bearing on said mechanism to adjust angularly as the inlet door pivots, and said bearing mount and bearing providing a fireproof enclosure between areas on opposed sides of the wall of said housing; and
   said housing defining a portion of an air duct to be connected to an inlet duct of the auxiliary power unit, and said wall forming a portion of the air duct, with said mechanism extending through the wall and into the air duct to be connected to said attachment member, and said bearing allowing said mechanism to adjust angularly within the wall.

2. The inlet door and actuation mechanism as set forth in claim 1, wherein said mechanism includes a screw and follower, said screw being driven to rotate and said follower being constrained from rotation such that it is driven axially to cause said inlet door to pivot.

3. The inlet door and actuation mechanism as set forth in claim 2, wherein a step motor is provided to drive said screw.

4. An inlet door and actuation mechanism for an auxiliary power unit comprising:
   an inlet door to be pivotally mounted;
   a mechanism for driving said inlet door to pivot, said mechanism including an attachment member attached to said door, said mechanism being mounted within a housing, a wall of said housing including a bearing mount for allowing a bearing on said mechanism to adjust angularly as the inlet door pivots, and said bearing mount and bearing providing a fireproof enclosure between areas on opposed sides of the wall of said housing; and
   a rotary encoder provides feedback information based upon an amount of rotation of said mechanism.

5. The inlet door and actuation mechanism as set forth in claim 4, wherein a stored position is reset to zero each time said door reaches an at least one extreme limit of its travel.

6. The inlet door and actuation mechanism as set forth in claim 1, wherein said bearing is a part spherical ball attached to said mechanism, and said bearing mount receives said ball and has a part spherical surface for mounting said ball.

7. The inlet door and actuation mechanism as set forth in claim 6, wherein a jam nut holds said ball at a desired location.

8. The inlet door and actuation mechanism as set forth in claim 6, wherein said ball and said bearing mount are formed of metal.

9. The inlet door and actuation mechanism as set forth in claim 1, wherein said housing defines an enclosure, and said opposed sides include one side within said enclosure and one side outside of said enclosure.

10. An inlet door and actuation mechanism for an auxiliary power unit comprising:
    an inlet door to be pivotally mounted;
    a mechanism for driving said inlet door to pivot, said mechanism including an attachment member attached to said door, said mechanism being mounted within a housing, said housing including a bearing mount for allowing a bearing on said mechanism to adjust angularly as the inlet door pivots, said bearing being a part spherical ball attached to said mechanism, and said bearing mount receiving said ball and having a part spherical surface for mounting said ball; and
    said housing including a wall, with said bearing mount and said bearing allowing said mechanism to adjust angularly within the wall, and said housing defining a portion of an air duct to communicate air to an inlet duct for an auxiliary power unit, and said wall forming a portion of the air duct.

11. The inlet door and actuation mechanism as set forth in claim 10, wherein said attachment member is attached to said door remotely from a pivot access of said door.

12. The inlet door and actuation mechanism as set forth in claim 10, wherein said inlet door is to be pivotably mounted within an aircraft.

13. The inlet door and actuation mechanism as set forth in claim 10, wherein said mechanism includes a screw and follower, said screw being driven to rotate and said follower being constrained from rotation such that it is driven axially to cause said inlet door to pivot, and wherein said ball is mounted on said screw.

14. The inlet door and actuation mechanism as set forth in claim 13, wherein a step motor is provided to drive said screw.

15. An inlet door and actuation mechanism for an auxiliary power unit comprising:
    an inlet door to be pivotally mounted;
    a mechanism for driving said inlet door to pivot, said mechanism including an attachment member attached to said door, said mechanism being mounted within a housing, said housing including a bearing mount for allowing a bearing on said mechanism to adjust angularly as the inlet door pivots, said bearing being a part spherical ball attached to said mechanism, and said bearing mount receiving said ball and having a part spherical surface for mounting said ball; and
    a rotary encoder provides feedback information based upon the amount of rotation of said mechanism.

16. The inlet door and actuation mechanism as set forth in claim 15, wherein a stored position is reset to zero each time said door reaches an extreme limit of its travel.

17. An inlet door and actuation mechanism for an auxiliary power unit comprising:
    an inlet door to be pivotally mounted;
    a mechanism for driving said inlet door to pivot, said mechanism including an attachment member attached to said door, said mechanism being mounted within a housing, said housing including a bearing mount for allowing a bearing on said mechanism to adjust angularly as the inlet door pivots, said bearing being a part spherical ball attached to said mechanism, and said bearing mount receiving said ball and having a part spherical surface for mounting said ball; and
    said mechanism extends through an opening at one end of said bearing mount, said bearing allows said mechanism to articulate within said bearing mount, with a clearance provided between a portion of said mechanism extending to said inlet door and said end of said bearing mount, and portions of said ball within said bearing mount are larger than said opening such that an enclosure is provided between said ball and said bearing mount.

18. The inlet door and actuation mechanism as set forth in claim 1, wherein said attachment member is attached to said door remotely from a pivot access of said door.

19. The inlet door and actuation mechanism as set forth in claim 1, wherein said inlet door is to be pivotably mounted within an aircraft.

* * * * *